S. ALSETH.
FLYTRAP.
APPLICATION FILED MAR. 26, 1921.
1,427,050.
Patented Aug. 22, 1922.
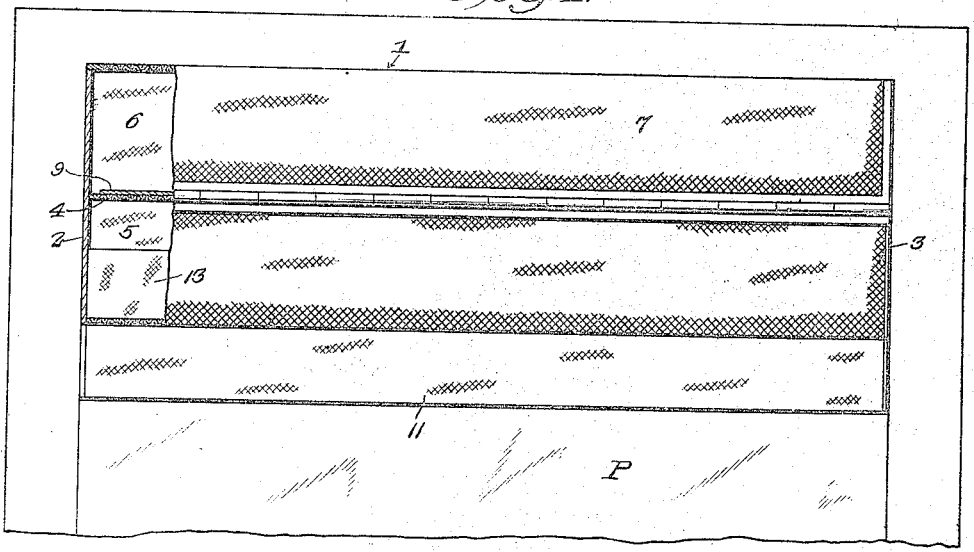
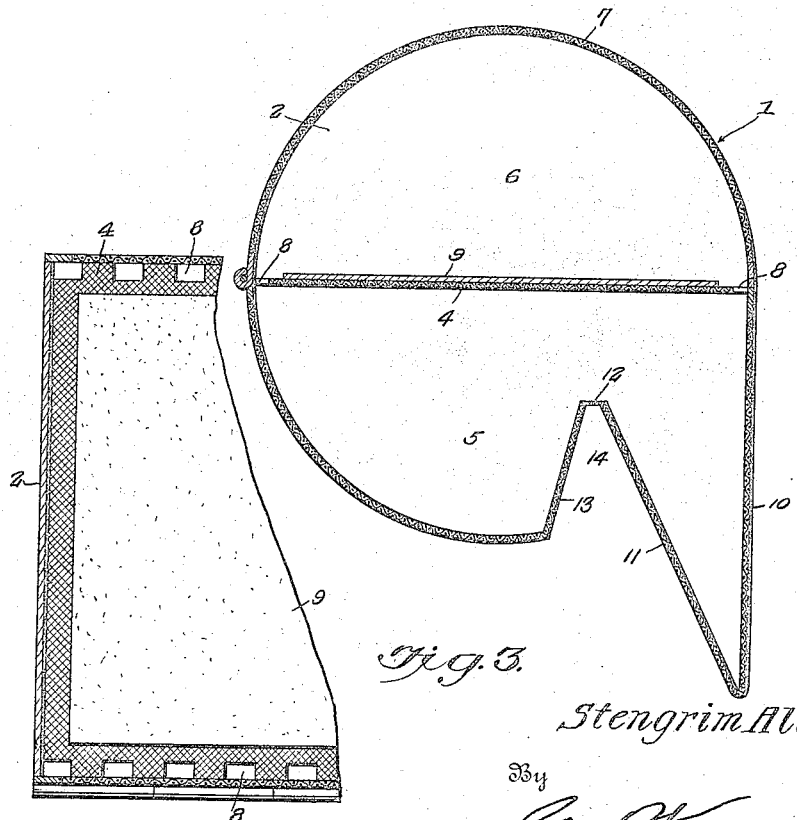
Inventor
Stengrim Alseth,
By Geo. P. Kimmel, Attorney

UNITED STATES PATENT OFFICE.

STENGRIM ALSETH, OF OSAKIS, MINNESOTA.

FLYTRAP.

1,427,050.
Specification of Letters Patent.
Patented Aug. 22, 1922.

Application filed March 26, 1921. Serial No. 455,760.

*To all whom it may concern:*

Be it known that I, STENGRIM ALSETH, a citizen of the United States, residing at Osakis, in the county of Douglas and State of Minnesota, have invented certain new and useful Improvements in a Flytrap, of which the following is a specification.

This invention relates to fly traps for windows.

The object of the invention is to provide a simple, cheap and efficient device of this character composed of wire gauze coiled in a partially cylindrical or coiled form and adapted for attachment to a window pane, window or door screen for attracting and trapping flies which usually seek light and assemble on window panes and follow them upward to the top of the window.

Another object is to provide a trap of screen or gauze wire including a reception chamber having a lead opening thereinto and communicating with which is an impounding chamber equipped with fly attracting and trapping means.

Another object is to provide an impounding chamber having a fly attractor and trapper and surrounded by inlet openings and having a hinged closure to afford access thereto.

With these and other objects in view the invention consists of such novel features of construction as are hereinafter shown and described and then specifically pointed out in the claims, and in the drawings illustrative of the preferred embodiment of the invention.

In the accompanying drawings:—

Figure 1 represents a front elevation of this improved trap shown applied with parts broken out and in section.

Fig. 2 is a transverse section thereof, and

Fig. 3 is an enlarged fragmentary horizontal section.

In the embodiment illustrated the trap 1 is constructed of wire gauze or screen wire which is coiled in a partially cylindrical or spiral form, and which is equipped with end members 2 and 3 composed of sheet metal and secured thereto by soldering or in any other suitable manner.

A horizontally disposed screen wire partition 4 divides the trap into a reception chamber 5 and an impounding chamber 6, the latter having a closure 7 hinged adjacent one edge of the partition and here shown semicircular in cross section and which constitutes the top and side walls of the chamber 6, the partition 4 constituting its bottom and also constituting the top wall of chamber 5.

The horizontal partition 4 is designed to support a sheet of fly paper 9 which forms the attracting and trapping means for the flies entering the impounding chamber 6. This partition 4 is also provided around its edges with a plurality of spaced fly inlet openings 8 which are disposed adjacent the walls of the trap 1 and the fly paper 9 so that the flies crawling up the sides of these walls may enter the impounding chamber 6 through the openings 8 from the reception chamber 5 and pass onto the sticky paper and be held in the usual manner.

The rear wall 10 of the trap is made rectilinear and is designed to lie flat against a window pane shown at P, or if the trap is mounted on a screen door or window against the screen wire of which the support is formed. The partial coiling of the wire gauze from which the trap is formed provides a lateral extension throughout the length thereof V-shaped in cross section as shown in Fig. 2, the inner wall of which forms a runway or lead 11 which opens at 12 into the reception chamber 5 and is designed to direct the flies which crawl up on the window pane into said chamber, the inclined lead 11 being positioned in their path when the device is applied and opposite which is arranged a guard 13 to direct the flies into the inlet 12.

In the use of this trap it is preferably mounted in any suitable manner at the upper portion of a window on the sash thereof with the rectilinear flat rear wall 10 fitting snugly against the window pane so that when the window shade is pulled down or partially down it will be obscured. When so mounted the flies which crawl up the window pane are directed by the leader or runway 11 through the opening 12 into the reception chamber 5 and from there they pass through the opening 8 into the impounding chamber 6 and are attracted by the fly paper 9 and become entangled therewith and are destroyed. When it is desired to place new fly paper in the chamber 6 obviously access may be had for this purpose by opening the top 7 which is hinged to open outwardly as shown clearly in Figs. 1 and 2. It is of course understood that the trap is to be detachably mounted on the window pane and to extend the full width thereof and if desired may be removed and submerged in water to destroy the flies collected should they not all pass from the reception chamber to the impounding chamber or those entering the impounding chamber not all become entangled with the fly-paper 9.

The upper portion of the runway or lead 11 in conjunction with the guard wall 13 arranged opposite thereto forms a substantially truncated cone shaped entrance 14 at the inner end of which is placed the inlet 12 affording communication with the reception chamber 5.

The preferred embodiment of the invention is disclosed in the drawings and set forth in the specifications, but it will be understood that any modifications within the scope of the claims may be made in the construction without departing from the principle of the invention or sacrificing any of its advantages.

What I claim is:—

1. A fly trap comprising a reception and an impounding chamber with passages between them, and an entrance chamber hingedly and detachably connected communicating with said reception chamber, fly piloting means leading to said entrance, and a fly attractor and trapper mounted in said impounding chamber.

2. A fly trap composed of two substantially semi-cylindrical sections hingedly connected along one side edge and detachably engaged along the other side edge a partition arranged therein and extending throughout the length thereof at the point of connection of the sections this partition having inlet openings along the side edges thereof, one of said sections having a lateral extension throughout the length thereof V-shaped in cross sections the inner wall of said extension forming a runway for the flies, said section having an inlet at the inner end of said runway and a guard for said inlet arranged opposite the runway whereby the flies are directed to said inlet.

In testimony whereof, I affix my signature hereto.

STENGRIM ALSETH.